United States Patent
Palmer et al.

(10) Patent No.: US 10,181,712 B2
(45) Date of Patent: Jan. 15, 2019

(54) METHOD AND APPARATUS FOR SUPPORTING A PERMANENT CABLE SPLICE DURING CABLE INSTALLATION

(71) Applicant: Quanta Associates, L.P., Houston, TX (US)

(72) Inventors: Robert Wayne Palmer, Houston, TX (US); Jody Milton Greer, Houston, TX (US); David Karl Wabnegger, Langley (CA)

(73) Assignee: Quanta Associates, L.P., Houston, TX (US)

( * ) Notice: Subject to any disclaimer, the term of this patent is extended or adjusted under 35 U.S.C. 154(b) by 0 days.

(21) Appl. No.: 15/983,929

(22) Filed: May 18, 2018

(65) Prior Publication Data

US 2018/0269675 A1    Sep. 20, 2018

Related U.S. Application Data

(63) Continuation of application No. 14/885,038, filed on Oct. 16, 2015, now Pat. No. 9,979,177.

(Continued)

(51) Int. Cl.
*H02G 15/08* (2006.01)
*H02G 15/18* (2006.01)
(Continued)

(52) U.S. Cl.
CPC ............... *H02G 15/18* (2013.01); *H01R 4/28* (2013.01); *H01R 13/5804* (2013.01); *H02G 15/113* (2013.01)

(58) Field of Classification Search
CPC ...... H02G 15/06; H02G 15/064; H02G 15/08; H02G 15/10; H02G 15/103; H02G 15/113; H02G 15/115; H02G 15/18; H02G 15/184; H02G 15/192; H02G 15/30; H01R 4/10; H01R 4/20; H01R 4/28; H01R 4/40; H01R 4/35; H01R 13/5804
(Continued)

(56) References Cited

U.S. PATENT DOCUMENTS 3,875,325 A * 4/1975 Anderson ............ H02G 15/003
174/76
3,992,569 A * 11/1976 Hankins ............... H02G 15/003
174/92

(Continued)

*Primary Examiner* — Angel R Estrada
(74) *Attorney, Agent, or Firm* — Oathout Law Firm; Mark A. Oathout; Antony C. Edwards

(57) ABSTRACT

A device is provided for supporting a permanent cable splice during installation of one or more connected electrical transmission cables. The device includes one or more liners adapted to be affixable over at least portion of the permanent cable splice including the ends of the splice and one or more sleeves mountable over at least a portion of each of the one or more liners. A method is further provided for installing electrical transmission cable including connecting the second end of a first cable to the first end of a second cable using a permanent splice, affixing one or more liners over at least a portion including the ends of the permanent cable splice, assembling one or more sleeves over at least a portion of each of the one or more liners, pulling the first cable, permanent splice and second cable over one or more sheaves along the installation travel path.

35 Claims, 15 Drawing Sheets

Related U.S. Application Data

(60) Provisional application No. 62/064,843, filed on Oct. 16, 2014.

(51) Int. Cl.
*H02G 15/113* (2006.01)
*H01R 4/28* (2006.01)
*H01R 13/58* (2006.01)

(58) Field of Classification Search
USPC ..... 174/68.1, 91, 72 A, 73.1, 650, 652, 135, 174/137 R, 74 R, 77 R, 84 R, 74 A, 85, 174/86, 92, 93, 167
See application file for complete search history.

(56) References Cited

U.S. PATENT DOCUMENTS

| | | | | |
|---|---|---|---|---|
| 4,435,612 A * | 3/1984 | Smith | ................ | G02B 6/4447 174/76 |
| 4,520,229 A * | 5/1985 | Luzzi | ................ | H02G 15/184 174/73.1 |
| 4,533,788 A * | 8/1985 | Pokojny | ................ | H02G 15/1806 174/88 C |
| 5,683,273 A * | 11/1997 | Garver | ................ | H01R 4/5025 174/84 R |
| 5,844,171 A * | 12/1998 | Fitzgerald | ................ | H02G 15/113 174/92 |
| 7,405,358 B2 * | 7/2008 | Emerson | ................ | H02G 15/18 174/88 R |
| 7,612,287 B2 * | 11/2009 | Ichikawa | ................ | H01R 4/72 174/77 R |
| 7,622,677 B2 * | 11/2009 | Barberree | ................ | H01R 9/0524 174/84 C |
| 7,952,020 B2 * | 5/2011 | Yamamoto | ................ | H01R 13/5208 174/23 R |
| 8,030,570 B2 * | 10/2011 | Seraj | ................ | H02G 15/1833 174/88 C |
| 8,653,368 B2 * | 2/2014 | Genco | ................ | H01R 4/186 174/77 R |
| 8,674,227 B2 * | 3/2014 | Williams | ................ | H01R 4/00 174/88 R |
| 9,202,612 B2 * | 12/2015 | Hernandez | ................ | H01B 17/58 |
| 9,979,177 B2 * | 5/2018 | Palmer | ................ | H01R 4/28 |
| 2008/0000672 A1 | 1/2008 | Yamamoto et al. | | |

* cited by examiner

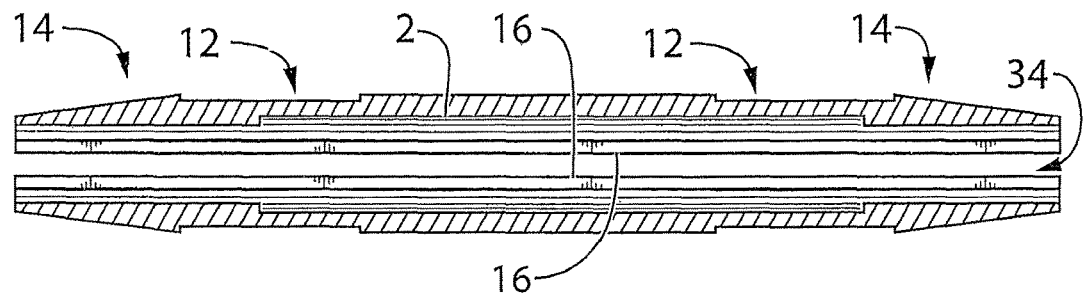
Fig. 3
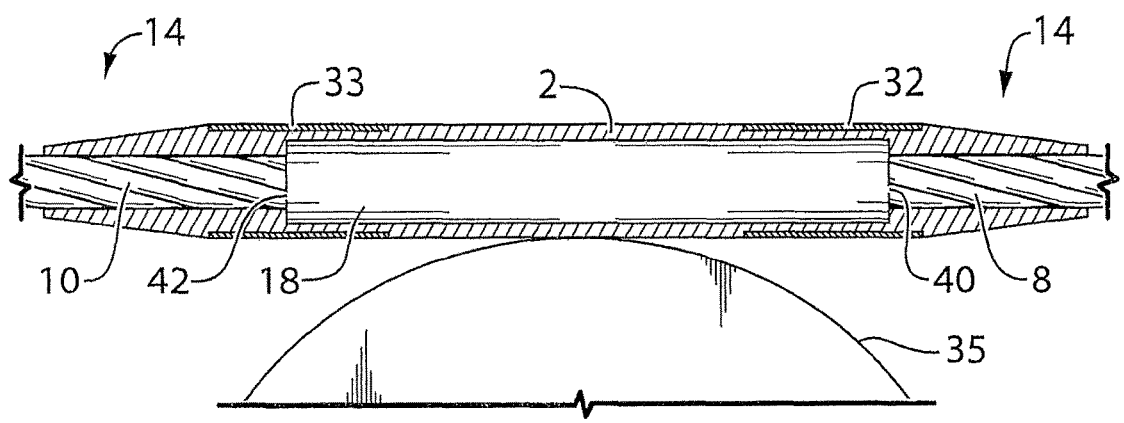
Fig. 4
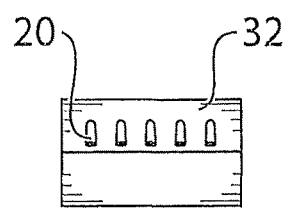 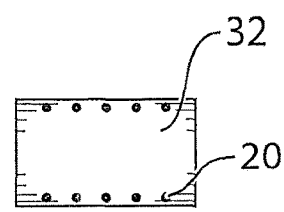
Fig. 5A  Fig. 5B

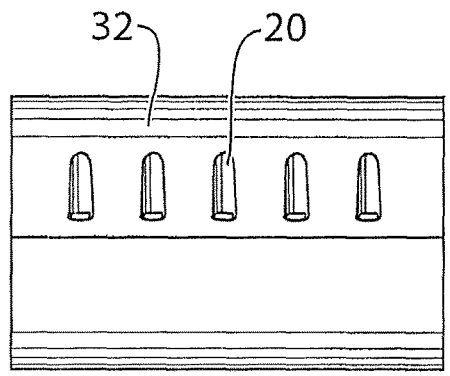
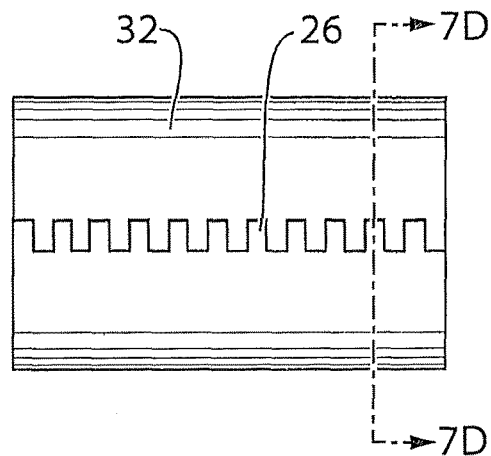
Fig. 7A          Fig. 7B
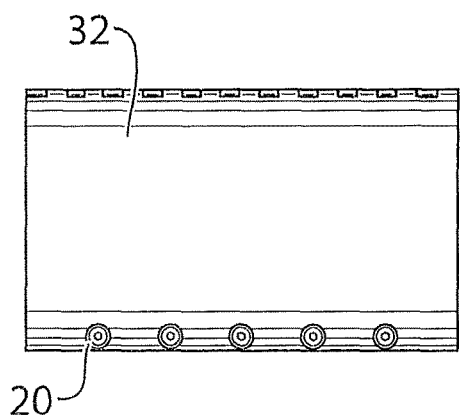
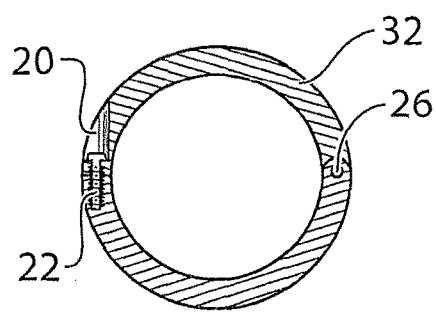
Fig. 7C          Fig. 7D

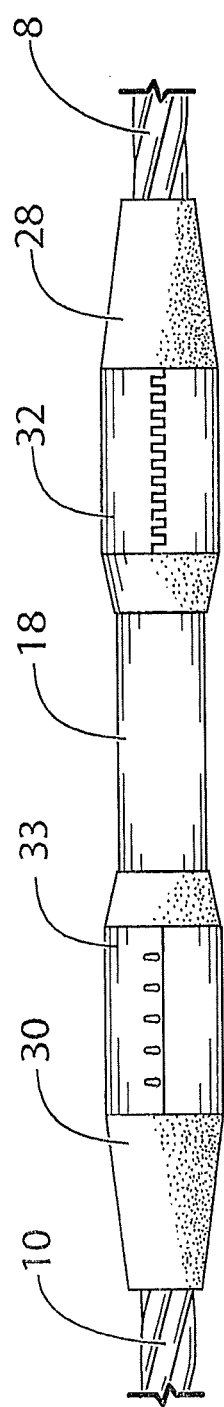
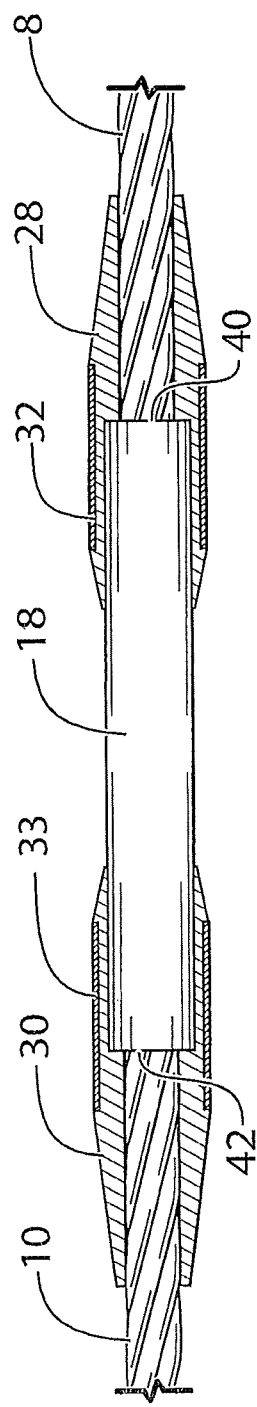

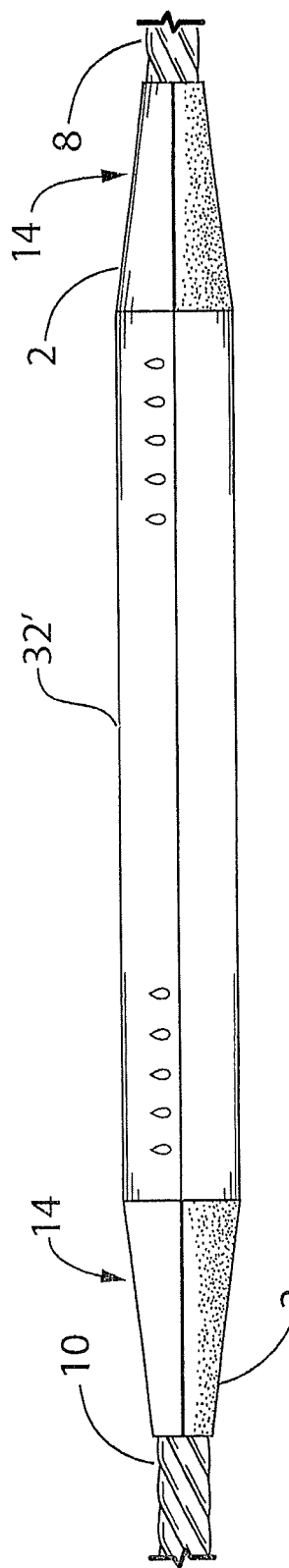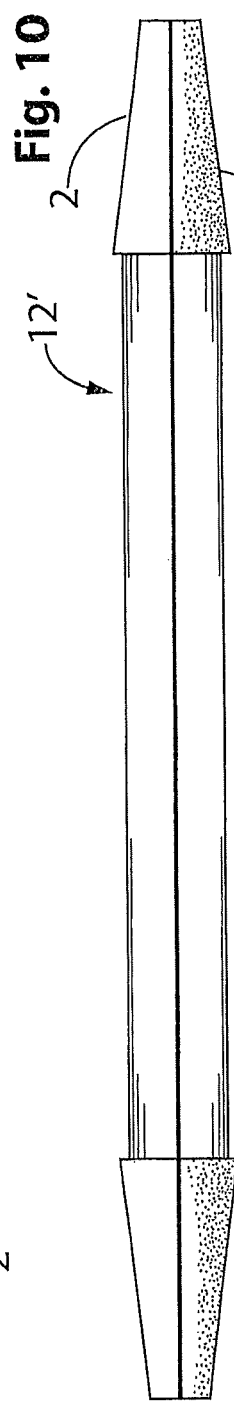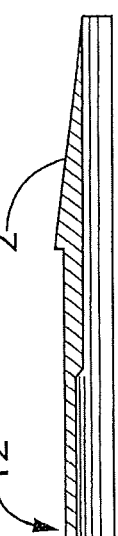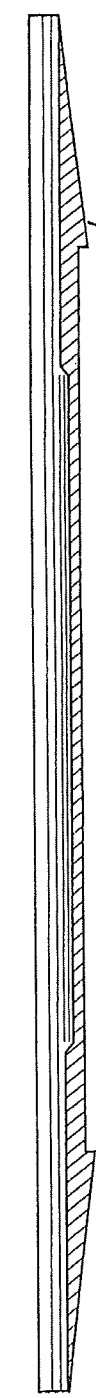
Fig. 10    Fig. 11    Fig. 12

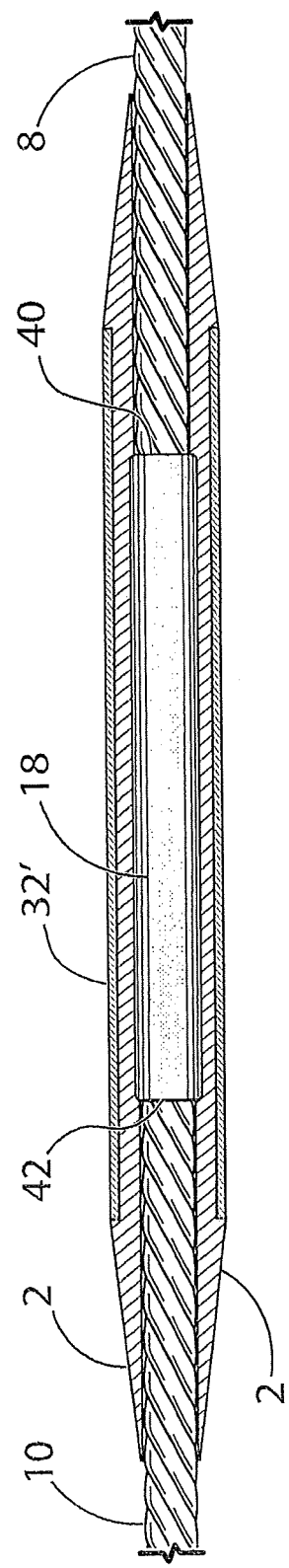

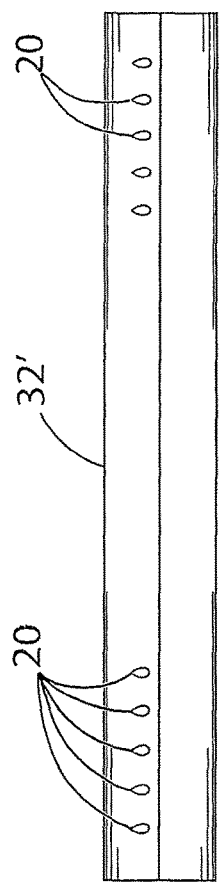
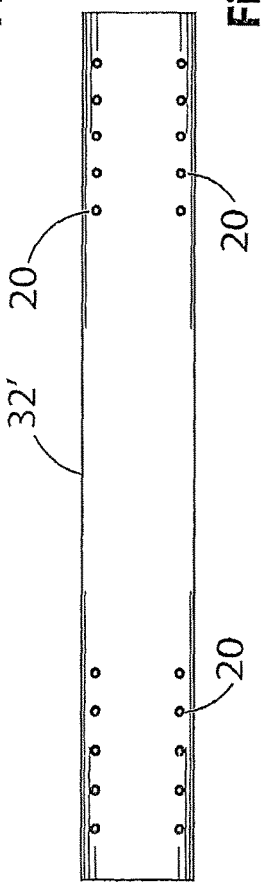
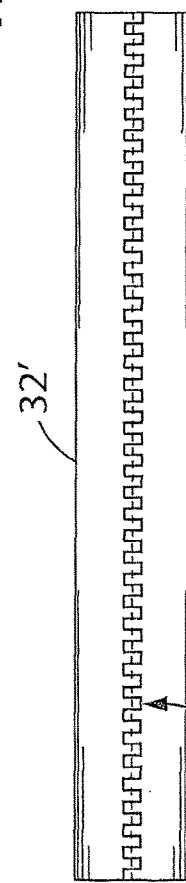
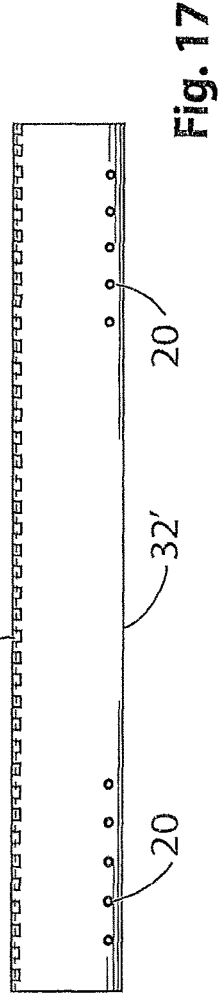

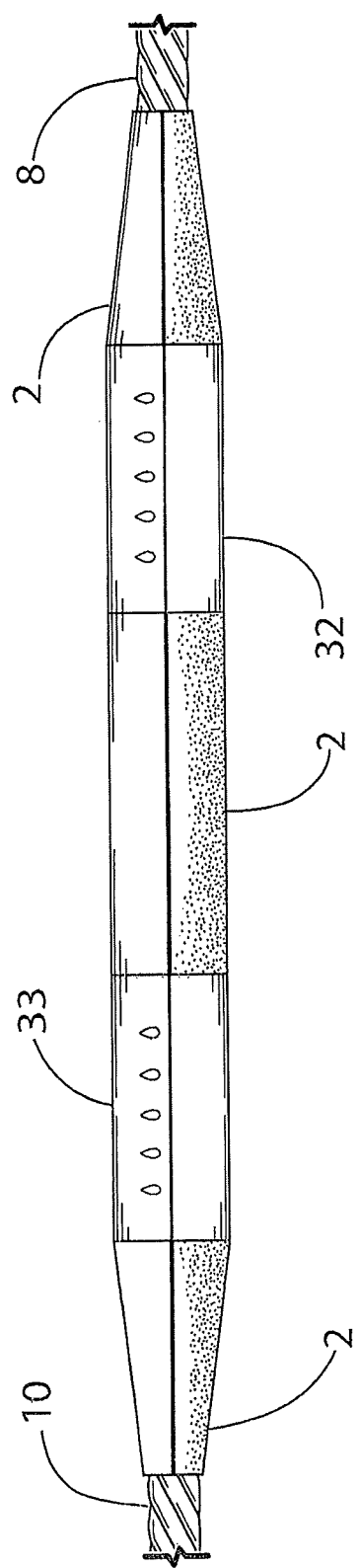

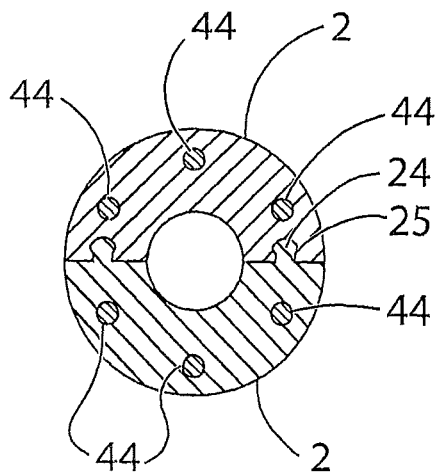
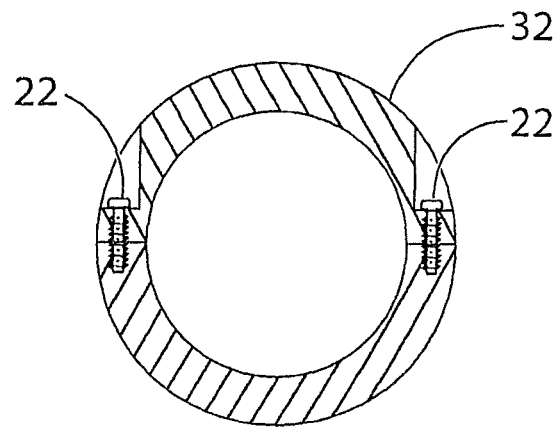
Fig. 22A    Fig. 22B
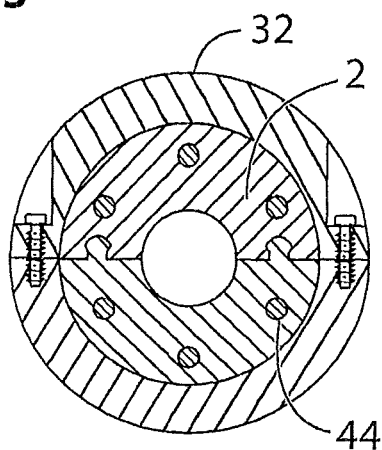
Fig. 22C
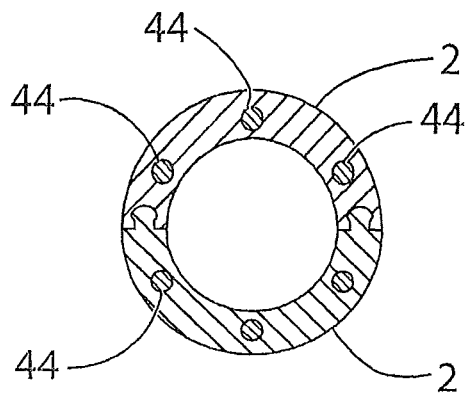
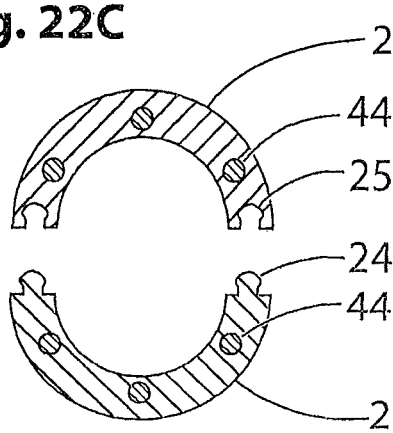
Fig. 22D    Fig. 22E

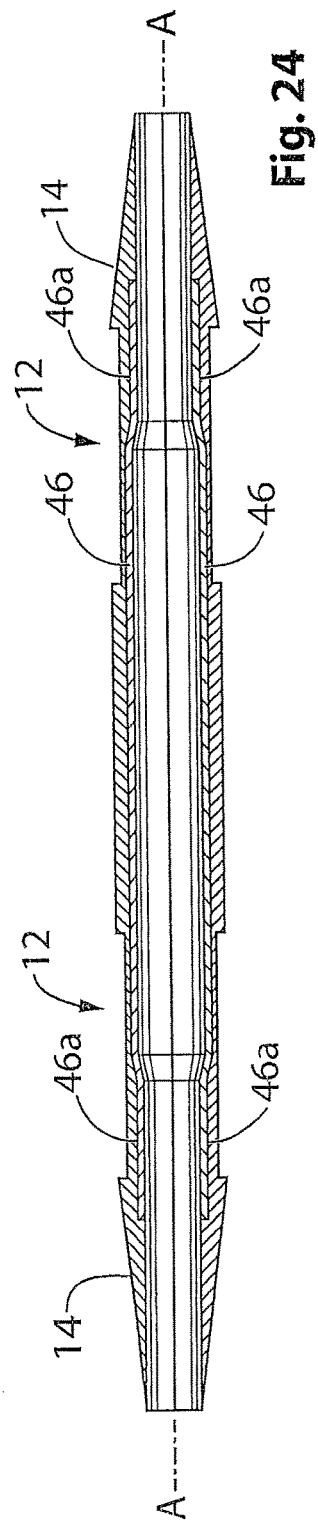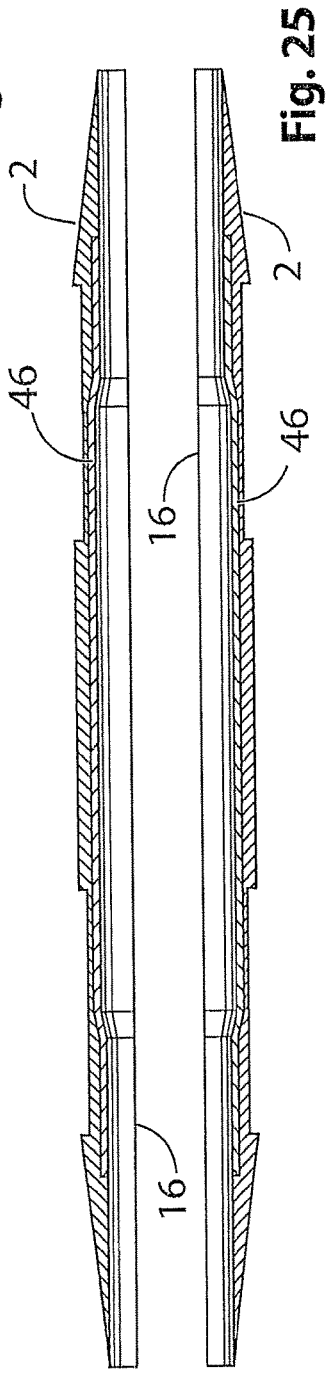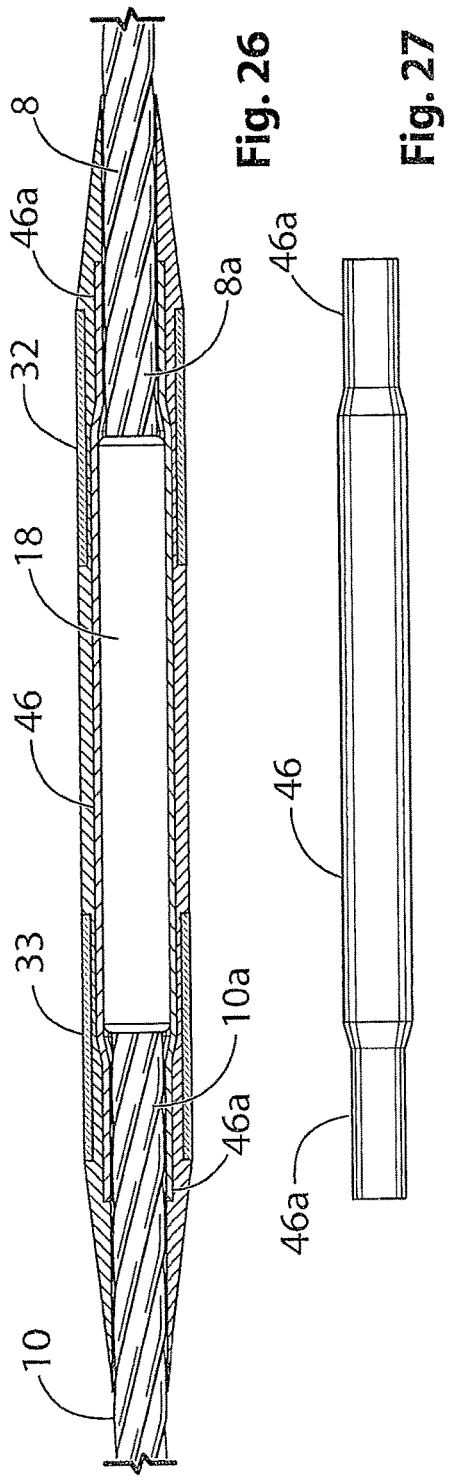

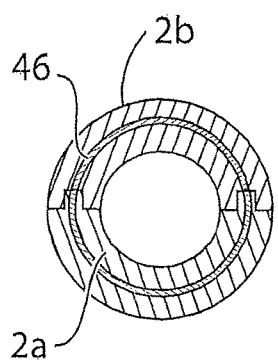 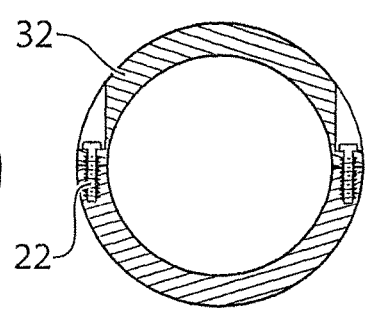 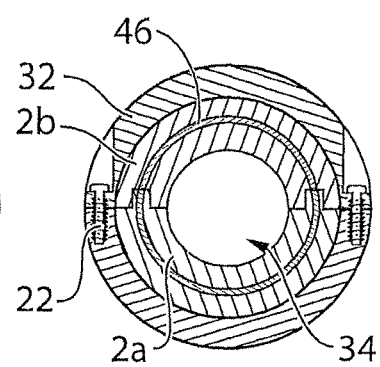
Fig. 28A   Fig. 28B   Fig. 28C
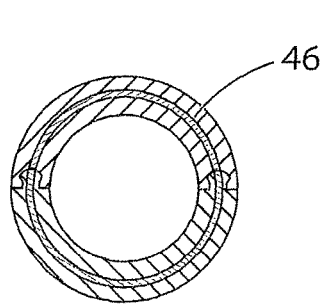 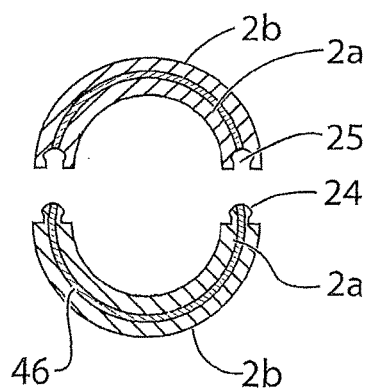
Fig. 28D   Fig. 28E

METHOD AND APPARATUS FOR SUPPORTING A PERMANENT CABLE SPLICE DURING CABLE INSTALLATION

CROSS REFERENCE TO RELATED APPLICATIONS

This application is a continuation application of U.S. patent application Ser. No. 14/885,038, filed on Oct. 16, 2015, entitled "METHOD AND APPARATUS FOR SUPPORTING A PERMANENT CABLE SPLICE DURING CABLE INSTALLATION", which in turn claims priority from U.S. Provisional Patent Application No. 62/064,843 filed on Oct. 16, 2014, entitled "DEVICE AND METHOD FOR CONNECTING AND INSTALLING CABLE", entireties of which are incorporated herein by reference.

FIELD OF THE INVENTION

The present disclosure relates to devices and methods for connecting lengths of electrical transmission cable and installing connected lengths of cables on cable supports; and in particular to a method and apparatus for supporting and protecting a permanent cable splice at its junction with the exposed ends of the spliced cables held within the splice during installation of the cables.

BACKGROUND OF THE INVENTION

In the installation or stringing of electrical transmission cables, lengths of cable, commonly provided on a reel, are pulled under tension into position over one or more cable supports, or sheaves. While it is desirable to maximize the length of cable to be installed, a number of limitations dictate the practical reel length of cable that can be used. Such limitations include terrain, angles at which the cable is pulled at, pulling capacity of the pulling equipment, both in terms of length and tension and capacity of the cable reels provided for the project.

Electrical transmission cables can include high voltage power line conductor, overhead static wire, and optical ground wire (OPGW). Cable properties, including the maximum bend angle and tension that a cable can handle, will also limit a maximum reel length of cable that may be deployed.

Commonly, multiple reel lengths of cable are connected together to make up the total length needed for installation. A splice is typically used to connect a second end of a first cable to a first end of a second cable. However, most permanent splices are not rated for the tension and flexibility required to pull the length of cable through the feed reel and over the sheaves and into a permanent, finished position. In such cases, temporary splices are conventionally used for the installation. Once the temporary splices are installed between the reel lengths of cable, the spliced cable is pulled into position. After pulling the cable into position, crews must remove the temporary splices and install permanent splices in their place.

A need therefore exists for a method and apparatus for protecting and supporting a permanent cable splice during cable installation.

SUMMARY OF THE INVENTION

The present invention may be characterized in its various aspects as a device, a system and a method of using the device and system.

The device is for protecting a permanent cable splice and the ends of a pair of electrical transmission cables held in the splice, and as part of the splice, during installation of the electrical transmission cables along a travel path which includes a forced curvature of the cables such as over sheaves. The splice is conventionally rigid and has opposite ends so as to form a junction at each of the opposite ends of the splice between the splice and the corresponding exposed ends of the cables held in the splice. The device in one aspect includes an elongate, hollow, resilient liner and an elongate sleeve, wherein the liner is advantageously longer than the sleeve. The sleeve is adapted to be snugly mounted over and along the liner. At least one end of the sleeve is inset along the liner from at least one corresponding end of the liner so long as the sleeve is mounted over at least one junction when the liner is mounted over the cable splice so as to position the cable splice within the hollow cavity of the liner. When the liner and the sleeve are so mounted on the cable splice, the sleeve compresses the liner against the cable splice at the corresponding junction whereby a stress concentration at the junction upon a bending of the cables relative to the splice during the forced curvature of the cables is distributed away from the junction.

In one aspect of the invention, an apparatus is provided for protecting an electrical conductor. The apparatus includes: an elongate, cylindrical liner defining a longitudinal through hole and a first circumferential groove; a first sleeve that resides within the first circumferential groove and around a circumference of the liner; and a first taper located at a first end of the liner, wherein one end of the first taper abuts the first sleeve. The liner may be substantially cylindrical and include a pair of opposed-facing half-pipes mountable to each other in opposed-facing relation so as to define the longitudinal through hole therethrough. The liner may have a second circumferential groove, spaced from the first circumferential groove along the liner. A second sleeve resides in the second circumferential groove.

Advantageously, a second taper is located at a second end of the liner opposite the first end so that a base end of the second taper abuts the body of the liner, and may abut the first sleeve if there is only one sleeve on the liner, or may abut the second sleeve if there are two sleeves on the liner.

In preferred embodiments, the liner is longer than the sleeve, or cumulative length of the sleeves if more than one sleeve is employed.

A cable splice is located within the through hole of the liner. When the liner and the sleeve or sleeves are mounted on the cable splice, the sleeve or sleeves compress the liner against the cable splice. Advantageously, the sleeves are rigid. The through hole is adapted for mounting over the cable splice on the electrical conductor. The liner may include at least one separate stiffener part mounted in the liner so as to extend along the liner and over at least opposite ends of the electrical conductor when the opposite ends of the electrical conductor are mounted in the cable splice and when the liner is mounted on the cable splice. The separate stiffener part may be one or more stiffener parts chosen from the group which includes: a rod, a plurality of rods, a plurality of rods in radially spaced apart array about a longitudinal axis of the liner, a split pipe, a half-pipe, a stringer. Each separate stiffener part may be elongate and substantially linear.

A system is provided for protecting a permanent cable splice and the ends of a pair of electrical transmission cables held in the splice during installation of the electrical transmission cables along a travel path which includes a forced curvature of the cables. The system includes: (a) a rigid cable splice having opposite ends so as to form a junction at each of the opposite ends of the splice between the splice and a corresponding exposed end of the cables held in the splice; one or more liners sized to both snugly mount over at least the opposite ends of the cable splice, over the junctions and over at least a portion of the exposed ends of cables where the exposed ends of the cables extend from the junctions; and, one or more removable sleeves mountable over at least a portion of each of the one or more liners and positioned on the one or more liners so as to cover the corresponding junctions. The one or more sleeves compress their corresponding liners against the cable splice at a corresponding junction whereby a stress concentration at the corresponding junction is distributed from the junction upon a bending of the cables relative to the splice during the forced curvature of the cables.

A method is provided of installing electrical transmission cable using the above described device and system of. The method includes:

a. providing a first cable having a first end and a second end;
b. providing a second cable having a first end and a second end;
c. installing the first cable by pulling the first cable over one or more sheaves to the second end of the first cable;
d. connecting the second end of the first cable to the first end of the second cable using a permanent splice;
e. affixing the one or more liners over at least a portion of the permanent cable splice to protect the permanent splice during the installation in steps (c) and (g);
f. assembling the one or more sleeves over at least a portion of each of the one or more liners to compress the one or more liners against the permanent splice at a junction of the permanent splice with the first cable and at a junction of the permanent splice with the second cable;
g. continuing the installation of step (c) by pulling the first cable, the permanent splice and the second cable over the one or more sheaves.

As applied to the device, system and/or method:

Advantageously the sleeves are rigid. The sleeves may be a single sleeve mounted on a single liner. The liner may have tapered ends at opposite ends thereof. At least one stiffener may be mounted in the liner so as to extend along the length of the liner and over at least the opposite ends of the cable splice when mounted thereon. Advantageously, the stiffeners extend over the junctions. The stiffeners may be chosen from the group comprising: a rod, a plurality of rods, a plurality of rods in radially spaced apart array about a longitudinal axis of the liner, a split pipe, a half-pipe, a stringer.

In one embodiment the one or more liners and the one or more sleeves are adapted to be removable from the cable splice when mounted thereon, and the method may include the removal of the sleeves and liners after the installation of the cables.

The one or more sleeves may be a pair of sleeves mounted spaced apart along the liner. The one or more liners may be a single liner. At least one tether may be provided, tethered to each of the pair of sleeves so as to join each sleeve to the other when mounted on the liner. The tethers may be flexible.

Advantageously the liners each include at least one annular recess formed therein, and in particular formed around an outer surface of the liners, each recess shaped and sized to receive mounted therein the one or more sleeves. The sleeves may be mounted substantially flush with the outer surface of the liners when the sleeves are mounted in their corresponding recesses.

In one embodiment each stiffener is elongate and substantially linear. Each stiffener may include a curved end which is curved over a corresponding junction when the liner is mounted over the cable splice. The curved end may extend from the junction so as to lie substantially flush onto the cable when the liner and sleeve are mounted onto the cable splice and cables. Each one of the stiffeners may have a curved end.

In one preferred embodiment, not intended to be limiting, the liner includes a pair of opposed-facing half-pipes or such other shape so as to be mountable to each other in opposed-facing relation to thereby define an elongate hollow cavity therethrough.

BRIEF DESCRIPTION OF THE DRAWINGS

FIG. 3 is a partially exploded view of the liner of FIG. 1, such as would be seen in cross-section along line 3-3 in FIG. 6E;

FIG. 4 is a side cross-sectional view of the liner and sleeve device of FIG. 1 illustrated passing over a sheave;

FIG. 5A is a side elevation view of one sleeve of the device of FIG. 1;

FIG. 5B is a plan view of the sleeve of FIG. 5A;

FIG. 7A is a first side elevation view of a further embodiment of a sleeve, such as seen mounted on a liner in FIG. 8;

FIG. 7B is a second side elevation view, from a side opposite the first side elevation view of the sleeve of FIG. 7A;

FIG. 7C is a plan view of the sleeve of FIGS. 7A and 7B;

FIG. 7D is a cross-sectional view along line 7D-7D in FIG. 7B showing a fastener and hinge.

FIG. 8 is a side elevation view of a further embodiment of the liner and sleeve device installed on two spliced-together lengths of cable;

FIG. 9 is a side cross-sectional view of the embodiment of the device illustrated in FIG. 8, installed on two connected lengths of cable;

FIG. 10 is, in side elevation view, a further embodiment of the liner and sleeve device having a single continuous sleeve encasing a single liner which extends over the entire length of the permanent cable splice.

FIG. 11 is, in side elevation view, the liner of FIG. 10.

FIG. 12 is, in partially exploded cross-sectional view, the liner of FIG. 11 in cross-section along its length.

FIG. 13 is a cross-sectional view of FIG. 10 along the length of the liner and sleeve device showing the device mounted onto a pair of cable ends held within a permanent cable splice.

FIG. 14 is, in side elevation view, the sleeve of FIG. 10.

FIG. 15, is, in plan view, the sleeve of FIG. 14.

FIG. 16 is, in side elevation view, a further embodiment of the sleeve of FIG. 14 illustrating the use of a hinge along one side of the sleeve.

FIG. 17 is, in plan view, a sleeve of FIG. 16.

FIG. 18 is, in side elevation view, a further embodiment of the liner and sleeve device mounted on a pair of cable ends held within a permanent cable splice.

FIG. 22A is a cross-sectional view through the liner of FIG. 18 in a plane laterally cross the length of the liner illustrating the section of the liner which snugly mounts onto an exposed end of a cable.

FIG. 22B is a cross-sectional view laterally across a sleeve of FIG. 18.

FIG. 22C is the combined cross-sectional views of FIGS. 22A and 22B.

FIG. 22D is a cross-sectional view laterally across the liner of FIG. 18 at a position along the liner where the liner snugly mounts onto the permanent cable splice.

FIG. 22E is, in partially exploded view, the cross-sectional view of FIG. 22D.

FIG. 24 is a cross sectional view along the length of the liner and sleeve device of FIG. 23 illustrating the use of the split pipe embedded within the liner.

FIG. 25 is, in partially exploded view, the cross-sectional view of FIG. 24

FIG. 26 is a cross-sectional view along the length of the liner and sleeve device of FIG. 23 illustrating the device mounted onto a pair of cable ends held within a permanent cable splice.

FIG. 27 is, in plan view, the split pipe embedded in the liner of FIG. 24

FIG. 28A is a cross sectional view through the liner of FIG. 23 at a position where the liner mounts onto one of the exposed ends of cable.

FIG. 28B is a cross-sectional view laterally through a sleeve of FIG. 23

FIG. 28C is a combined cross-sectional view of FIGS. 28A and 28B.

FIG. 28D is a cross-sectional view laterally through the liner of FIG. 23 at a position where the liner mounts onto the permanent cable splice.

FIG. 28E is, in partially exploded view, the cross-sectional view of FIG. 28D.

DETAILED DESCRIPTION OF THE PREFERRED EMBODIMENTS

Figure 1:
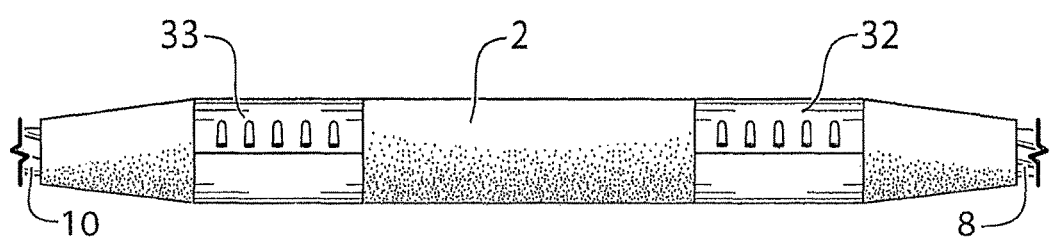
FIG. 1 is a side elevation view of one embodiment of a liner and sleeve device installed on a permanent splice connecting two separate lengths of cable.
Figure 2:
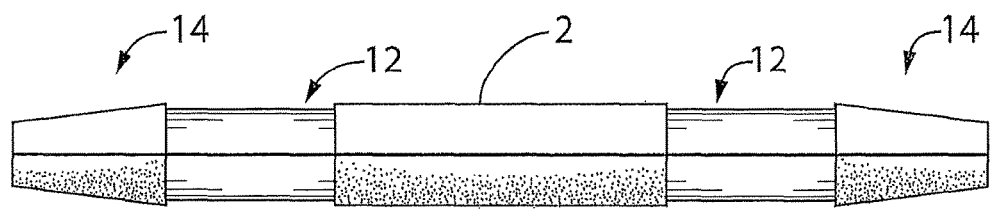
FIG. 2 is a side cross-sectional view of the liner of FIG. 1, such as would be seen in cross-section along line 2-2 in FIG. 6A.

The present disclosure provides a liner and sleeve device, a system, and a method of using same to support a permanent cable splice and the corresponding ends of the electrical transmission cables held within the cable splice in withstanding tension and bending forces when the cables and permanent cable splice are being pulled into place for installation, thus allowing a permanent splice rather than a temporary splice to be used during installation. The present liner and sleeve device can be used with conventional permanent splices commonly available, thereby avoiding the need for the installation and removal of temporary splices.

The present liner and sleeve device serves to withstand, transfer and distribute bending loads and stresses that tend to concentrate at the splice-cable junction at each end of the permanent cable splice during tension and bending of the cable as it is installed. The present liner and splice device deflects and distributes these stress concentrations from the splice-cable junctions to the sleeve and liner adjacent; that is, in the area surrounding each of the splice-cable junctions, thereby reducing and helping to prevent damage to either the permanent cable splice or the cable during installation of the cable.

The present liner and splice device further allows for a permanent splice to be installed at the tensioning site during the installation process, without the need for a temporary splice that later requires removal and replacement with a permanent splice. Once the cable is installed, the present liner and sleeve device may be removed. Such removal is quicker and easier than removing a temporary splice and installing a permanent splice.

With reference to the Figures, the present liner and sleeve device includes a generally cylindrically shaped hollow liner 2, which may be two separate pieces that, when installed, surrounds a permanent cable splice 18. Splice 18 splices together, and electrically joins, in a linear array the ends of a first cable 8 and a second cable 10. One or more sleeves 32, 33 are sized so as to compress liner 2 when mounted thereon. Preferably, liner 2 may be made of a semi-rigid, resilient material that may be moulded to form an inner channel 34 of shape and size so as to snugly fit the cable splice 18 and cables 8, 10 mounted journaled therein. Liner 2 and the compression of liner 2 provided by the one or more sleeves 32, 33 serve to receive the stress concentrations experienced at the junctions between the cable splice 18 and each of the cables 8, 10 and distribute these stresses through the liner 2 to protect the mechanical integrity of the splice 18 and cables 8, 10, and in particular the junctions therebetween, during installation of the cables into position onto electrical transmission towers, for example.

Figure 6A:
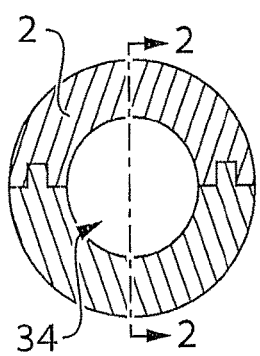
FIG. 6A is a cross-sectional view of the liner of FIG. 2 in a plane orthogonal to the longitudinal axis of the liner.
Figure 6B:
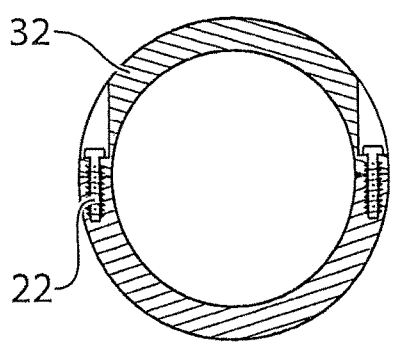
FIG. 6B is a cross-sectional diagrammatic view, not to scale, of one of the sleeves of FIG. 1 in a plane orthogonal to the longitudinal axis of the sleeve.
Figure 6C:
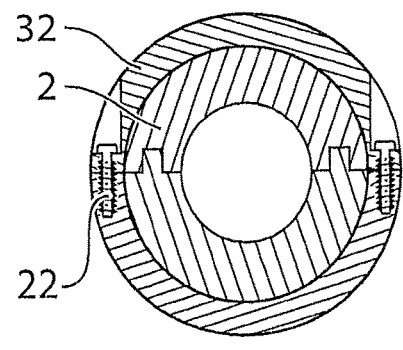
FIG. 6C is a cross-sectional view of the liner and sleeve of FIGS. 6A and 6B respectively with the sleeve mounted on the liner.
Figure 6D:
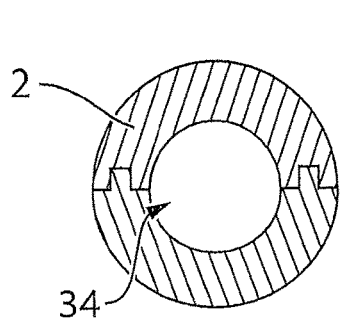
FIG. 6D is the view of FIG. 6A showing the liner assembled.
Figure 6E:
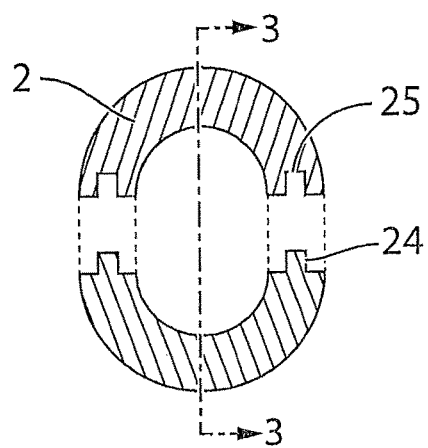
FIG. 6E is the liner of FIG. 6A showing the liner in a partially exploded view.

The liner 2 may be manufactured from a material that may be both semi-rigid and resiliently compressible, such as for example, without intending to be limiting in any way: rubber, a flame retardant polymer, or a composite material such as a rubber compound. Liner 2 may exhibit elastic properties so as to restore or return itself to its non-deformed geometric shape after deployment over a sheave (FIG. 4). Liner 2 may incorporate separate, flexible reinforcement or strengthening materials or structures made of, for example, steel, titanium, or fiberglass or aramids or polymers as such structures are described below by way of example. It will be understood by a person ordinarily skilled in the art that various types of materials, including composite materials, may be suitable for the manufacture of the liner 2, wherein such materials may be semi-rigid or resiliently bendable and compressible. As seen in FIGS. 3 and 6E, in one embodiment the liner 2 may be made of two mating semi-cylindrical pieces resembling half-pipes that are fastened together in opposed facing relation along their long edges 16. Such fastening may take any form well known in the art, including but not limited to the use of adhesives, separate fasteners such as screws, bolts, or pins, or by mating profiles formed on the long edges 16 of each liner piece that cooperate with one another to fasten the liner pieces to each other. Such mating profiles can include tongue 24 and groove 25 profiles as illustrated in FIGS. 6A, C, D and E, although it would be well understood by a person of skill in the art that other profiles are also possible and encompassed within the scope of the present teaching.

The liner 2 may advantageously, although not necessarily, have one or more annular grooves or recesses 12 formed on or around an outer surface thereof. Recesses 12, which may also be a circumferential recess, are sized to accommodate each of the one or more sleeves 32, 33 such that, for example, an outer surface of each sleeve 32, 33 lies substantially flush, or flush, with the outer surface of liner 2, so as to be mounted therein flush with or slightly raised from the outer surface of the liner 2. This not only secures each sleeve on the liner in its desired position on or adjacent the junction between cable splice 18 and the exposed ends of the cables 8, 10, but also may inhibit protruding edges of sleeves 32, 33 from catching on for example a traveller 35, sheaves or reels during stringing of the cables 8, 10 through the traveller, sheaves or reels. Preferably, the liner 2 may have tapers 14 that taper at their distal ends so as to be flush or near flush with the cables 8, 10. The ends of the liner 2 are thus less likely to catch on the traveller 35, sheaves or reels during stringing of the cable. Furthermore, tapers ends 14 facilitate smooth, initial contact with a surface of traveler 35. The base ends of tapers 14, opposite their distal ends, abut the corresponding ends of the cylindrical body of liner 2, and from part thereof to assist in distributing the stress concentrations throughout the liner 2. This helps the liner 2 to bend more easily at its ends around the circumference of the cylindrical surfaces of the traveler 35 and the reels as the cables 8, 10 are pulled under tension from the reels and through travellers 35 during installation along a travel path which includes such forced curvature.

With reference to FIGS. 5A through 7D, in one embodiment the sleeves 32, 33 may be made up of two mating half-pipes that, when mounted on splice 18 and cables 8, 10, mate together in an opposed-facing, snug compression fit around the liner 2 to thereby compress the liner 2 radially inwardly; that is, radially inwardly relative to the longitudinal axis A (FIG. 3) of the liner. Sleeves 32, 33 also protect the junctions 40, 42 between the permanent splice 18 and each of the exposed ends of cables 8, 10. The two half-pipes of each sleeve 32, 33 are preferably fastened by means of one or more fasteners 22 that are inserted or threaded through one or more openings 20 in each half-pipe of the sleeve. Other means of joining the sleeve half-pipes are also contemplated, such as application of adhesive or machining or otherwise forming the sleeve components to form cooperating protrusions-and-indents for example tongue-and-groove, etc., that will frictionally or otherwise interfit when brought together. However, fasteners 22 provide the advantage that they may be tightened to provide a desired level of compression of the liner 2 onto the splice 18 and the spliced cables 8, 10 within the liner 2. Fasteners 22 may also be easily removed after installation. Alternatively, each sleeve 32, 33 may consist of two halves that open in a clam-shell arrangement about hinge 26, thereby requiring the use of fasteners 22 or other joining means along only one side of the sleeve 32 that may be opposite hinge 26 (FIG. 7D).

Preferably the sleeves 32, 33 are rigid. For example, without intending to be limiting, the sleeves 32, 33 may be manufactured from steel, titanium, or composites or other suitably rigid material. Further preferably, the sleeves 32, 33 may be made to a standard length and may accommodate standard fasteners 22, such that the sleeves 32, 33 can be used in a multitude of cable connection and installation applications.

In some cases, for example where splice 18 is reinforced, encasement in liner 2, or within a liner 2 and sleeves 32, 33 along the entire length of splice 18 may not be required. In such cases, where splice 18 may be reinforced by an insert such as a steel insert (not shown) as illustrated in FIGS. 8 and 9 a first liner 28 is mounted over junction 40 between splice 18 and an adjacent exposed end of the first cable 8, and a second liner 30 is mounted over the junction 42 between the splice 18 and an adjacent exposed end of the second cable 10. In such cases, the two liners 28, 30 are still sized according to the diameters of the permanent splice 18 and cables 8, 10, so as to mount substantially flush thereon but the length of the liners 28, 30 may be standardized such that the liners 28, 30 are adaptable to multiple splicing applications. In such cases, only one sleeve 32, 33 may preferably be required per liner 28, 30 respectively. A single liner and sleeve is thus used for each junction 40, 42 separately.

In a typical use, a first end of first cable 8 is pulled off of the reel and installed in tension over one or more sheaves. Once the second, opposite, end of the first cable 8 is reached, it is connected by permanent cable splice 18 to a first end of the second cable 10, which may be stored on another reel. Connecting may be done during the installing process while the cables are under tension. One or more liners 2 are assembled over the permanent cable splice 18 and the adjacent exposed ends of the cables 8, 10. The liner 2 may be assembled by mounting the two half-pipe pieces of the liner 2 together along their long edges 16. In the embodiment illustrated in FIG. 4, one liner 2 is assembled over the permanent cable splice 18 and extends over each of the junctions 40, 42. Alternatively, as illustrated in FIG. 9, two liners 28, 30 may be used, in which case a liner 28, 30 is assembled over each of the corresponding junctions 40, 42. Next, one or more sleeves 32, 33 are installed over the liner 2 or liners 28, 30, as the case may be, and over the junctions 40, 42, to compress liner 2 or liners 28, 30 and to encase and thereby protect the junctions 40, 42. Installation of the connected cables 8, 10 over one or more sheaves, such as sheaves mounted on electrical transmission towers, is then continued under tension. The liner and sleeve pairs protect the permanent splice and serve to transfer stress concentration from the junctions 40, 42 and distribute the stress concentrations through the liner 2 or liners 28, 30 and through the sleeves 32, 33 to reduce the combined effect of shearing, tension and bending forces experienced at the junctions 40, 42 during installation of the cables 8, 10.

As a second, opposite, end of the second cable 10 is reached, it too may be connected to a further (i.e. third) cable by a second permanent splice and the second permanent splice may be encased by assembly of another of the present liner and sleeve devices to the second permanent splice and cable junctions. The process of pulling cable, installing under tension, splicing and protecting the splice and adjacent exposed ends of the cables with the present liner and sleeve device may be repeated until a full installation of the desired length of electrical transmission cable is complete. Then, optionally, the liner and sleeve devices may be removed from the permanently spliced and installed electrical transmission cable by removing sleeves 32, 33 and then removing the one or more liners 2 or 28, 30 as the case may be.

In a further embodiment such as seen in FIGS. 10-17, a single, long sleeve 32' extends over a corresponding length of liner 2 from a first junction 40 between splice 18 and the exposed end of cable 8 to a second junction 42 between splice 18 and the exposed end of cable 10. Sleeve 32 and liner 2 further extend to cover at least an adjacent portion of the exposed ends of each of the cables 8, 10, adjacent junctions 40, 42. Thus sleeves 32, 33 (FIG. 8) may be replaced by a single sleeve 32' so as to encase splice 18 and the corresponding length of liner 2, again, with the ends of liner 2 and sleeve 32' extending beyond junctions 40, 42 so that stress concentrations due to a bending applied to the cables and splice at those junctions are relieved by liner 2 and sleeve 32'. The sleeve 32' may be removably secured onto liner 2 by the same means described above in relation to sleeves 32, 33 Thus for example, sleeve 32' may comprise two, separate, non-connected, opposing-facing half-pipes and fasteners 22 may be employed in fastener openings 20. Alternatively, sleeve 32' may include a hinge or hinges 26 to provide for clamshell opening of the sleeve around liner 2. Liner 2 may be shaped to flush mount sleeve 32' flush along the length of the liner so as to mate sleeve 32' in an extended annular recess 12'. Again, tapers 14 may advantageously be provided on opposite ends of liner 2 for ease of contacting and passing the liner and sleeve device over for example a traveller 35.

Figure 19:
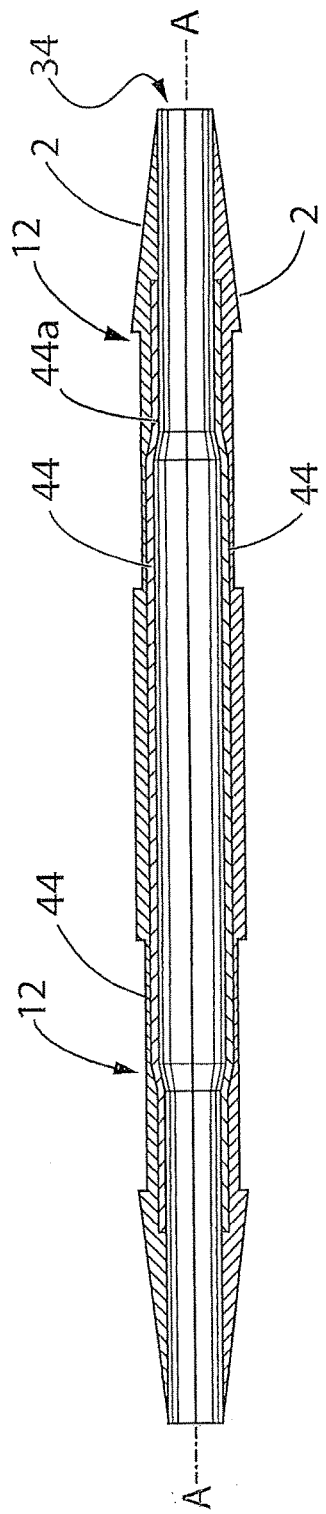
FIG. 19 is a cross-sectional view along the length of the liner and sleeve device of FIG. 18 showing the use of rods embedded within the liner.
Figure 20:
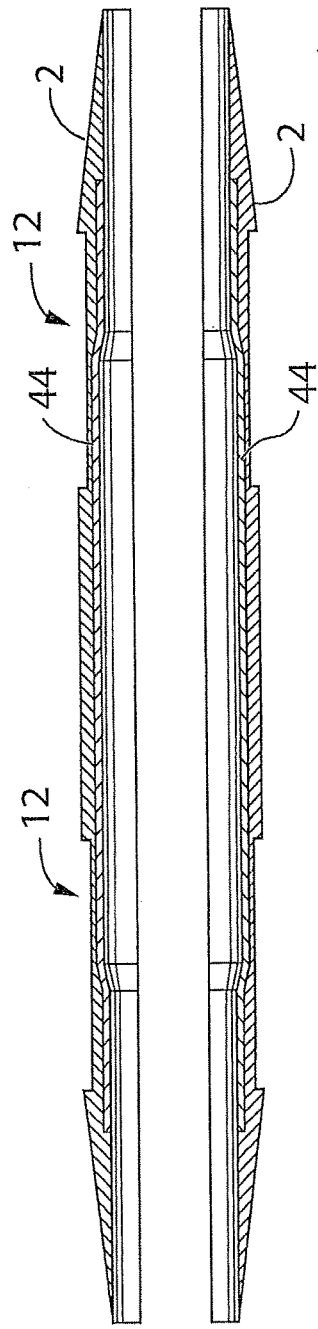
FIG. 20 is a partially exploded view of the liner of FIG. 19.
Figure 21:
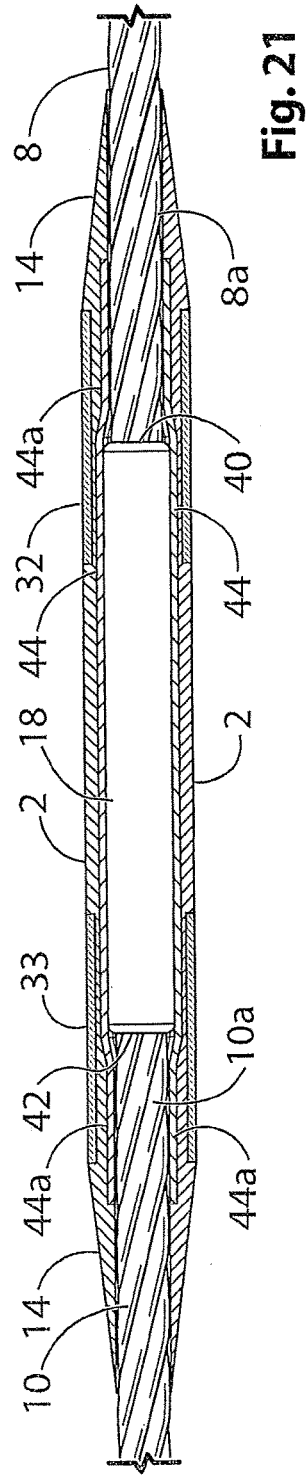
FIG. 21 is a cross-sectional view along the length of the liner and sleeve device of FIG. 18 illustrating the device mounted on the pair of cable ends held within a permanent cable splice.
Figure 23:
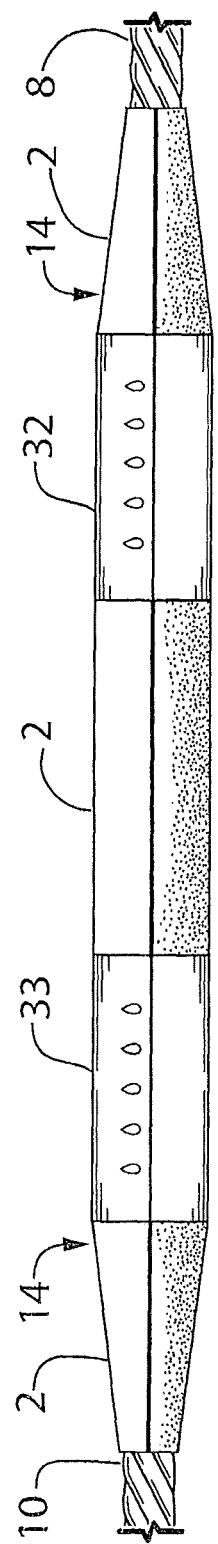
FIG. 23 is, in side elevation view, yet a further embodiment of the liner and sleeve device mounted onto a pair of cable ends held within a permanent cable splice.

In the embodiments of FIGS. 18-21, and FIGS. 22A-22E, liner 2 is reinforced with stiffeners such as reinforcing rods 44. One or more reinforcing rods 44 may be employed, preferably embedded within liner 2. As illustrated, a plurality, shown as six, rods 44 may be embedded in liner 2 so as to extend along the length of liner 2 in radially spaced apart array about and substantially parallel to the longitudinal axis A of liner 2 (FIG. 19). Rods 44 are preferably semi-rigid or may be resilient or elastic to a predetermined value so as to assist in resisting or assist in withstanding the bending moment applied to liner 2 and the corresponding sleeve or sleeves at junctions 40, 42 when splice 18, which is encased in a liner and sleeve or sleeves, passes over (e.g. completely over and past) for example traveller 35. Rods 44 may be linear, at least for example over the length of splice 18, and may advantageously also include curved ends such as flush-mounting curved ends 44a which extend so as to mount down flush onto the outer surface of the adjacent ends of cables 8, 10. Thus as seen in the side elevation cross-sectional view of FIG. 21, rods 44 may be mounted almost flush along the exterior surface of splice 18, and curved ends 44a may curve over the ends of splice 18 at junctions 40, 42 and extend so as to lie flush along the adjacent exposed ends 8a, 10a of conductor cables 8, 10 respectively. The ends of rods 44 may, as illustrated in at least FIGS. 19-21, extend beyond the ends of the sleeve or sleeves so as to extend under at least a portion of tapered ends 14 of liner 2.

The embodiments of FIGS. 22A-22E, although diagrammatically illustrated, show how the dimensions of the liner 2 and sleeve 32' or sleeves 32, 33 may be varied so that, as shown, the sleeves and liners may be relatively thick-walled. In the embodiment of FIGS. 18-21 the sleeves and liner are relatively thin-walled as compared to the diameter of the cables and splice. If the sleeve or sleeves and liner are thick-walled, better protection from shearing and stress loading upon bending is potentially obtained at the junctions 40, 42 as compared to thin-walled sleeves and liner, given the same material for the sleeves and liner. However the thick-walled sleeves and liner may have more difficulty passing over for example a traveller 35. An optimized balance of wall thickness and protection from shearing and bending stresses is preferred that will distribute the stress loading at the junctions 40, 42 during bending so as to reduce stress concentrations and still allow passage through traveller 35 or through other forced curvature travel paths while stringing the conductor.

FIGS. 23-27 and FIGS. 28A-28E illustrate a further embodiment where, instead of rods 44, a segment or segments of split pipe 46 (e.g. completely separate, non-connected sections) are employed to reinforce liner 2 and distribute the stress concentrations around junctions 40, 42 into liner 2. Thus, as with rods 44, the ends of split pipe 46 extend cantilevered along liner 2 from the ends of splice 18 at junctions 40, 42. Split pipe 46 may include a generally cylindrical, semi-rigid, or resilient, pipe which is split or otherwise formed into separate halves along its length. Each half is mounted into a corresponding half-pipe of liner 2 so that the halves of both the split pipe 46 and liner 2 may be mounted flush against one another in opposed facing relation as shown by way of example in FIGS. 28A and 28E. Thus, as with the use of rods 44, as seen in FIG. 26 split pipe 46 may be mounted in liner 2 so as to extend along, substantially flush against the exterior surface of splice 18 and then contiguously extend as flush-mounting ends 46a away from junctions 40, 42 substantially flush along the corresponding adjacent exposed ends 8a, 10a of conductor cables 8, 10. The distal ends of flush-mounting ends 46a, distal from splice 18, may extend into tapers 14. As with the use of rods 44, the use of split pipe 46 is not limited to the illustrated embodiment where a plurality of sleeves, for example sleeves 32, 33, are employed, but may also be used in the embodiment of FIG. 10 where only one sleeve 32' is employed. Further, as seen diagrammatically in FIGS. 28A-28E, the sleeve or sleeves and liner may be relatively thick-walled and split pipe 46 may for example generally bi-sect the radial thickness of liner 2, measured in a direction radial from longitudinal axis A. Bi-secting of the thickness of liner 2 may thus form an inner half-pipe 2a and an adjacent outer half-pipe 2b.

As will be understood, the description of rods 44 and split-pipe 46 are intended to merely be non-limiting examples of strengthening stiffeners or stringers or the like that may be embedded in liner 2 that serve to distribute stress loading at the ends of splice 18 upon forced curvature of the cable ends and permanent splice as when passing the splice through a traveller 35 for example. Similar to using rods 44, the use of split-pipe 46 may provide resistance to bending and provide a restoring force to liner 2 when liner 2 is subjected to a bending moment by traveller 35. It is also intended to be within the scope of the present invention to use multiple liners 2, for example nested or separate, or any combination thereof, instead of a single liner 2 to protect a single permanent splice 18. Further, although described herein as being both removable and intended to be removed upon completion of the conductor stringing operation, it may be that it is impractical to immediately or ever remove the sleeves and liners from the splices. As is common with electrical transmission lines, such as with high-voltage electrical transmission lines, the span of the strung electrical conductors can be over relatively great distances and thus the locations of the splices may be in locations which are very difficult or otherwise very expensive or dangerous to physically reach, or virtually impossible for a lineman to physically access to remove the sleeves and liners. Thus it is intended to be within the scope of the present invention that the sleeve and liner arrangements described herein may be installed without necessarily being easily removable from the splice, and thus more permanent means for holding the encasing of the sleeves and liners about the splices may be employed.

Figure 29:
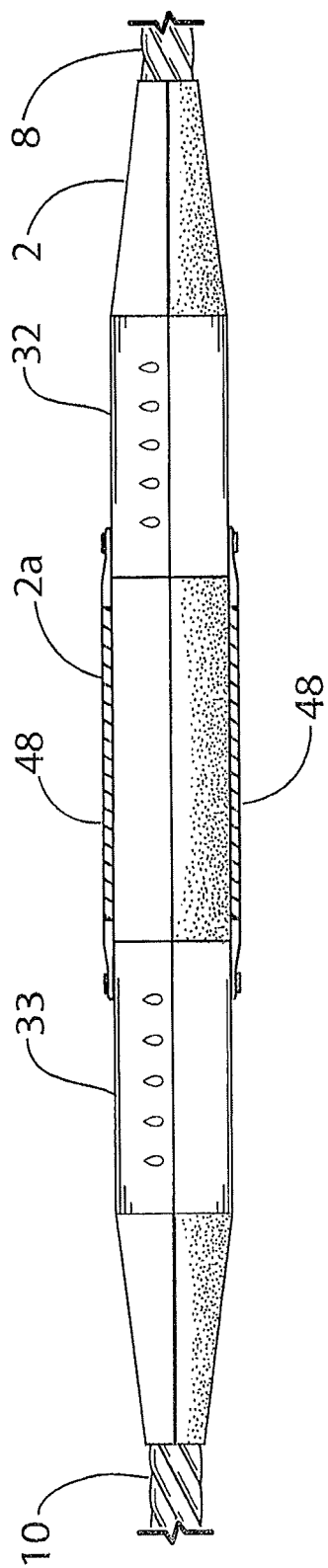
FIG. 29 is, in side elevation view, the liner and sleeve device of FIG. 18 illustrating the use of tethers between the pair of sleeves.
Figure 30:
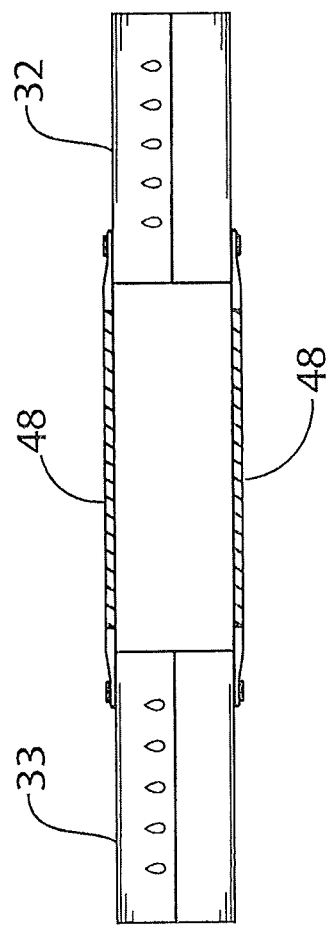
FIG. 30 is, in side elevation view, the pair of sleeves and tethers of FIG. 29.

As seen in FIGS. 29 and 30, in embodiments employing multiple sleeves, such as the pair of sleeves 32, 33, tethers 48 may be mounted across a span 2a of liner 2 extending between the sleeves. Tethers 48 may be lengths of flexible wire for example which are riveted or otherwise fastened at their ends to the pair of sleeves on either end of span 2a. Tethers 48 serve to hold in place the sleeves and corresponding sections of liner 2 sandwiched between the sleeves and splice 18. Thus for example in the event that liner 2 fails in tension along its longitudinal axis A, for example span 2a splits while being pulled around a forced curvature in the conductor stringing travel path, tethers 48 will hold the sleeves and liner in place.

This detailed description of the present devices and methods is used to illustrate certain embodiments of the present teaching. It will be apparent to a person skilled in the art that various modifications can be made and various alternate embodiments may be utilized without departing from the scope of the present application, which is limited only by the appended claims.

What is claimed is:

1. A method for protecting a permanent cable splice and the ends of a pair of electrical transmission cables held in the splice during installation of the electrical transmission cables along a travel path which includes a forced curvature of the cables, and wherein the splice is rigid and has opposite ends so as to form a junction at each of the opposite ends of the splice between the splice and the corresponding exposed ends of the cables, the method comprising:
   a) providing an elongate, resilient liner having a hollow cavity and providing an elongate sleeve, wherein the liner is longer than the sleeve, and the sleeve is adapted to be snugly mounted over and along the liner, inset along the liner from at least one end of the liner and over at least one junction when the liner is mounted over the cable splice,
   b) positioning the cable splice within the hollow cavity in the liner,
   c) mounting the liner and the sleeve on the cable splice so as to position the cable splice within the hollow cavity of the liner and so as to position the sleeve over and along the liner inset along the liner from at least one end of the liner and over a corresponding junction of the junctions at each of the opposite ends of the splice, and
   d) during step (c), using the sleeve, compressing the liner against the cable splice at the junction,
      whereby a stress concentration at the junction upon a bending of the cables relative to the splice during the forced curvature of the cables is distributed away from the junction.

2. The method of claim 1 wherein the sleeve is rigid.

3. The method of claim 2 wherein the sleeve includes a plurality of sleeves.

4. The method of claim 1 wherein the liner has tapered ends at opposite ends thereof.

5. The method of claim 4 further comprising providing at least one stiffener and mounting the stiffener in the liner so as to extend along the liner and over at least the opposite ends of the cable splice when mounted thereon.

6. The method of claim 5 wherein said at least one stiffener extends over said junctions.

7. The method of claim 5 wherein said at least one stiffener is chosen from the group comprising: a rod, a plurality of rods, a plurality of rods in radially spaced apart array about a longitudinal axis of the liner, a split pipe, a half-pipe, a stringer.

8. The method of claim 1 wherein the liner and the sleeve are adapted to be removable from the cable splice when mounted thereon.

9. The method of claim 3 wherein the one or more sleeves are a pair of sleeves mounted spaced apart along the liner.

10. The method of claim 1 wherein the liner is a plurality of liners.

11. The method of claim 3 further comprising at least one tether tethered to each of the sleeves so as to join by the at least one tether each sleeve to another of the sleeves when mounted on the liner.

12. The method of claim 11 wherein said at least one tether is flexible.

13. The method of claim 1 wherein the liner includes an annular recess formed therearound shaped and sized to receive the sleeve mounted therein.

14. The method of claim 13 wherein the sleeve is mounted so as to be substantially flush with an outer surface of the liner when mounted in corresponding the recess.

15. The method of claim 7 wherein each stiffener is elongate and substantially linear.

16. The method of claim 15 wherein at least one end of each stiffener includes a curved end and positioning the curved end so as to curve over the junction.

17. The method of claim 16 wherein the curved end extends from the junction so as to lie substantially flush onto the cable when the at least one liner and sleeve are mounted onto the cable splice and cables.

18. The method of claim 17 wherein each one of the at least one stiffener has said curved end.

19. The method of claim 1 wherein the liner includes a pair of opposed-facing half-pipes mountable to each other in opposed-facing relation so as to define the elongate hollow cavity therethrough when so mounted.

20. The method of claim 1 comprising:
   a) providing a first cable having a first end and a second end;
   b) providing a second cable having a first end and a second end;
   c) installing the first cable by pulling the first cable over one or more sheaves to the second end of the first cable;
   d) connecting the second end of the first cable to the first end of the second cable using the cable splice;
   e) affixing the liner over at least a portion of the cable splice to protect the cable splice during the installation in steps (c) and (g);
   f) assembling the sleeve over at least a portion of the liner to compress the liner against the cable splice at a junction of the cable splice with the first cable and at a junction of the cable splice with the second cable;
   g) continuing the installation of step (c) by pulling the first cable, the cable splice and the second cable over the one or more sheaves.

21. A method for protecting an electrical conductor having a permanent cable splice, the method comprising:

a) providing an elongate resilient liner defining a longitudinal through-hole, a first circumferential groove, and a tapered end extending from the groove, and positioning the cable splice within and centered along the through-hole, b) mounting a first sleeve within the first circumferential groove and around a circumference of the liner;

c) tensioning the sleeve around, so as to compress the groove and the liner.

22. The method of claim 21 wherein the liner is substantially cylindrical.

23. The method of claim 22, wherein the liner is a pair of opposed-facing half-pipes mountable to each other in opposed-facing relation so as to define the longitudinal through-hole when so mounted.

24. The method of claim 21, wherein the liner has a second circumferential groove, spaced from the first circumferential groove along the liner, and further comprises providing a second sleeve, and mounting the second sleeve resides in said second circumferential groove.

25. The method of claim 21, wherein the liner has a second taper located at a second end of the liner opposite the first end, and wherein the second taper is oppositely disposed to the first taper.

26. The method of claim 24, further comprising a second taper located at a second end of said liner opposite said first end, wherein the first and second tapers are oppositely disposed.

27. The method of claim 21, wherein the liner is longer than the first sleeve.

28. The method of claim 24, wherein the liner is a pair of liners and wherein each liner of the pair of liners is longer than any one of the first sleeve or the second sleeve.

29. The method of claim 24, wherein the liner is longer than combined lengths of the first and second sleeves.

30. The method of claim 25, wherein the step of mounting the first sleeve positions the sleeve over and along the liner so as to contact said liner and base ends of the first and second tapers.

31. The method of claim 21, wherein the step of tensioning the sleeve compresses the liner against the cable splice.

32. The method of claim 24, wherein the first sleeve and the second sleeve are rigid.

33. The method of claim 21, wherein further comprising providing at least one stiffener and coupling the stiffener to the liner so as to extend along the liner and over at least opposite ends of the electrical conductor when the opposite ends of the electrical conductor are mounted in the cable splice and when the liner is mounted on the cable splice.

34. The method of claim 33, wherein the stiffener is chosen from said group comprising: a rod, a plurality of rods, a plurality of rods in radially spaced apart array about a longitudinal axis of the liner, a split pipe, a half-pipe, a stringer.

35. The method of claim 33, wherein the stiffener is elongate and substantially linear.

* * * * *